United States Patent [19]

Bott

[11] Patent Number: 4,887,947
[45] Date of Patent: Dec. 19, 1989

[54] CARGO RESTRAINT SYSTEM FOR PICK-UP TRUCK BEDLINERS

[76] Inventor: John A. Bott, 931 Lakeshore Dr., Grosse Pointe Shores, Mich. 48236

[21] Appl. No.: 249,234

[22] Filed: Sep. 22, 1988

Related U.S. Application Data

[63] Continuation of Ser. No. 27,835, Mar. 19, 1987, abandoned.

[51] Int. Cl.⁴ .................................................. B60P 1/64
[52] U.S. Cl. .................................... 410/144; 410/129; 296/39.2
[58] Field of Search .......................... 296/39.2, 37.6; 410/129, 140, 141, 143, 144, 151, 152

[56] References Cited

U.S. PATENT DOCUMENTS

| | | | |
|---|---|---|---|
| D. 271,009 | 10/1983 | Fishler | 296/39 R |
| Re. 287,788 | 4/1976 | Williamson | 410/118 |
| 1,059,058 | 4/1913 | McDonald | 296/39 R |
| 2,388,304 | 11/1945 | Ackerman et al. | 410/46 |
| 2,518,342 | 8/1950 | Lim | 296/26 |
| 2,697,631 | 12/1954 | Miller | 296/37.6 |
| 2,791,463 | 5/1957 | Levitt | 296/39 R |
| 2,808,788 | 10/1957 | Stough | 410/89 |
| 2,985,333 | 5/1961 | Kirkman | 220/22.3 |
| 2,986,315 | 5/1961 | Zimmerman | 224/42.32 |
| 3,193,122 | 7/1965 | Sauthoff | 410/40 |
| 3,203,363 | 8/1965 | Miller | 410/135 |
| 3,229,994 | 1/1966 | Klein | 410/144 |
| 3,428,330 | 2/1969 | Klein | 410/156 |
| 3,620,171 | 11/1971 | Brenia et al. | 410/105 |
| 3,643,973 | 2/1972 | Bott | 410/101 |
| 3,680,492 | 8/1972 | Weage | 410/129 |
| 3,779,174 | 12/1973 | Doyle et al. | 410/121 |
| 3,845,601 | 11/1974 | Kostecky | 52/290 |
| 4,029,244 | 6/1977 | Roberts | 224/42.42 |
| 4,049,311 | 9/1977 | Dietrich et al. | 296/24 R |
| 4,181,349 | 1/1980 | Nix et al. | 296/39 R |
| 4,185,799 | 1/1980 | Richards, Jr. | 244/118.5 R |
| 4,200,046 | 4/1980 | Koliba et al. | 410/94 |
| 4,226,348 | 10/1980 | Dottor et al. | 224/42.42 |
| 4,278,376 | 7/1981 | Hunter | 410/130 |
| 4,341,412 | 7/1982 | Wayne | 296/39 R |
| 4,446,526 | 5/1969 | Peters | 296/37.16 |
| 4,500,020 | 2/1985 | Rasor | 224/321 |
| 4,507,033 | 3/1985 | Boyd | 410/104 |
| 4,531,775 | 7/1985 | Beals | 296/37.6 |
| 4,536,025 | 8/1985 | Yamawaki et al. | 296/37.16 |
| 4,540,213 | 9/1985 | Herlitz et al. | 296/37.5 |
| 4,750,776 | 6/1988 | Barben | 296/39.2 |

FOREIGN PATENT DOCUMENTS

| | | | |
|---|---|---|---|
| 106533 | 1/1927 | Austria | 410/140 |
| 1161214 | 8/1958 | France | |
| 1439762 | 4/1966 | France | 296/39 R |
| 2395861 | 1/1979 | France | |
| 1588292 | 4/1981 | United Kingdom | |

Primary Examiner—Dennis H. Pedder
Attorney, Agent, or Firm—Harness, Dickey & Pierce

[57] ABSTRACT

A cargo restraint system for the bed of a truck comprising a pair of recess members each secured to opposing truck side walls. A bed liner may also be included in the combination. An elongated stop block being releasably assembled into grooves in said recess members for adjustable movement in said recess members as part of a multi-faceted, but easily disassembled system for cargo restraint for use in trucks, vans, station wagons and the like.

2 Claims, 2 Drawing Sheets

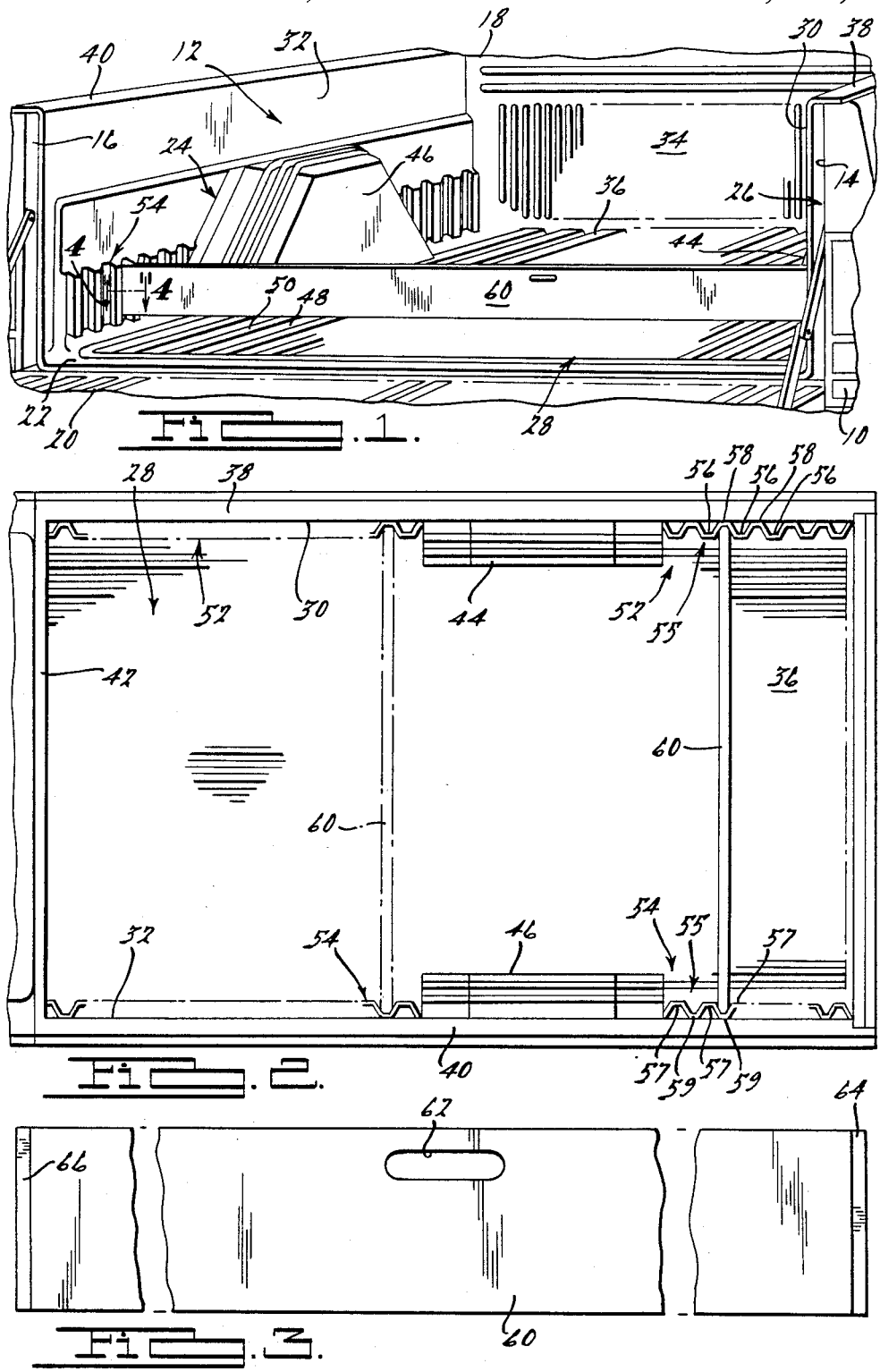

U.S. Patent  Dec. 19, 1989  Sheet 2 of 2  4,887,947
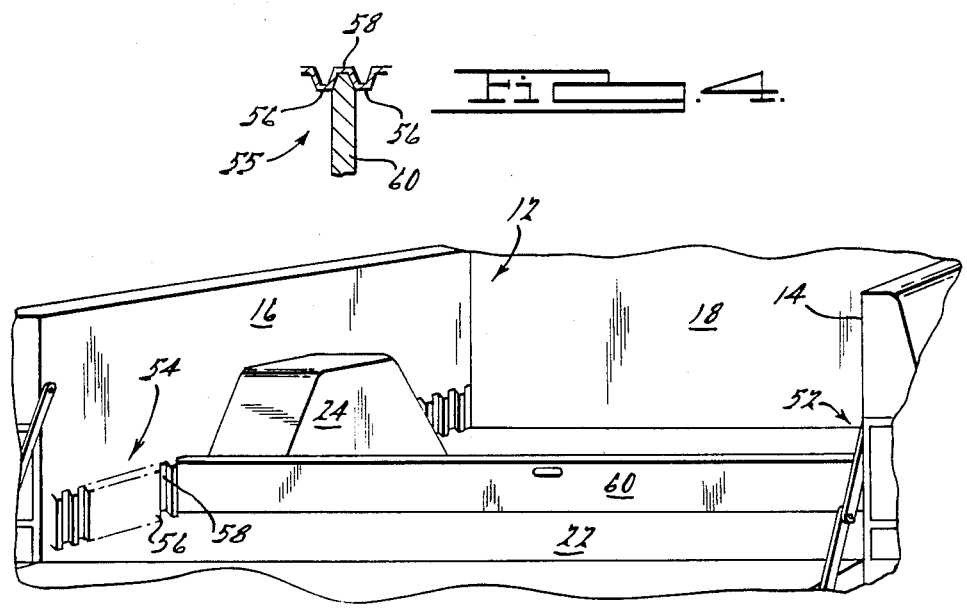
FIG. 4.
FIG. 5.
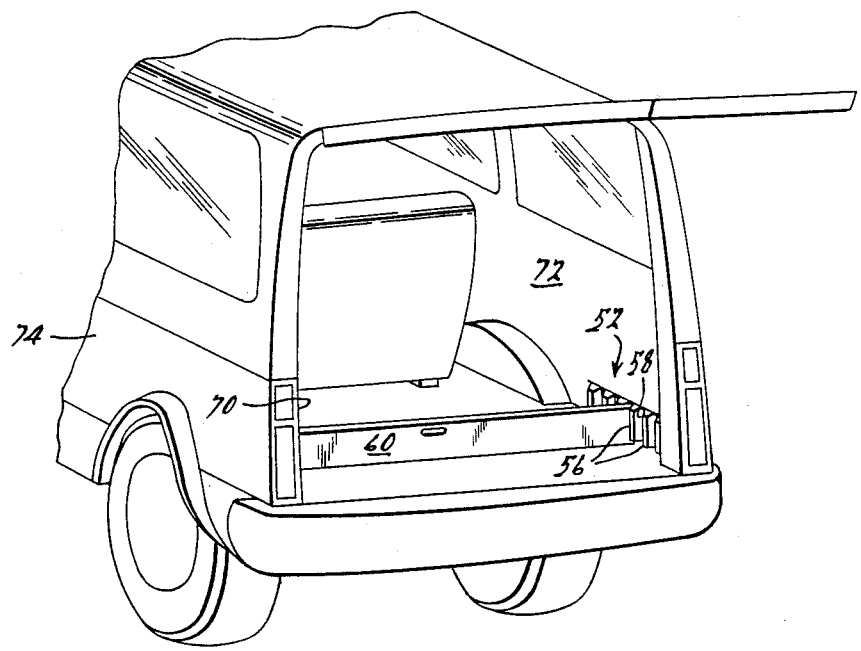
FIG. 6.

CARGO RESTRAINT SYSTEM FOR PICK-UP TRUCK BEDLINERS

This application is a continuation of application Ser. No. 027,835 filed Mar. 19, 1987, now abandoned.

BACKGROUND AND SUMMARY OF THE INVENTION

The present invention relates generally to restraint systems for cargo on trucks and similar cargo transporting vehicles having designated cargo carrying space and, more particularly, to a system for restraining cargo in the bed of a truck such as a pick-up truck or the like.

Truck beds are subject to substantial amounts of wear and tear due to the nature of the various types of cargo carried, the lack of care utilized by those placing the cargo in the bed and withdrawing it from the bed, and various environmental effects. Reconstruction of the truck bed is a substantial and costly procedure usually resulting in retirement of the entire vehicle.

Furthermore, cargo restraint systems for truck beds, and the like generally are limited by the nature of the cargo believed to be utilized. With pick-up trucks and similar load carrying vehicles, cargo is generally variable in size and a multi-faceted, multi-purpose cargo restraint system is believed to be highly valuable. With the ever increasing use of pick-up trucks and the like which also have other day-to-day uses, such as commuting to and from work, for which some aesthetic appeal is desirable, a means of retaining aesthetic appeal in the vehicle used is also significant.

Accordingly, in the present invention, a cargo restraint system is presented which may incorporate a liner for the bed of a truck into an improved restraint system for the cargo in the bed. Recess members capable of receiving a stop block are retained on the sides of the truck bed or liner. The liner may also have recesses and upper surfaces. Generally, the cargo is supported on the upper surfaces of the bed liner so that the liner may bear the wear or other effects caused by movement of the cargo. The bed liner utilizes the recesses as both drainage elements and also to lower the frictional interface between the cargo and the cargo support surfaces as the cargo is moved across the bed. The liner, of course, is wear-resistant and puncture-resistant, but is also readily replaceable without impairment of the structure of the underlying truck bed.

Additionally, the cargo restraint system may be mounted directly to the truck bed or mounted in the interior of a van or station wagon. If so mounted, various cargo securing or load supporting elements may be utilized with the recess elements of the cargo restraint system.

The present invention includes a cargo restraint system that has readily releasable components to make the system and the cargo restrained in the system easy to set up, use, adjust, modify, and/or disassemble as desired without interfering with the other functions of the load storage area of a vehicle. The components of the system themselves are also modifiable for various uses.

From the following detailed description taken in conjunction with the accompanying drawings, other objects and advantages of the present invention will become apparent to one skilled in the art.

BRIEF DESCRIPTION OF THE DRAWINGS

FIG. 1 is an elevated perspective view of the rear of a pick-up truck having the present invention installed in the bed of the truck;

FIG. 2 is a plan view of the bed of the truck of FIG. 1;

FIG. 3 is an elevational view of the elongated stop member of FIG. 1;

FIG. 4 is a partial cross-section view of FIG. 1 along line 4—4 thereof;

FIG. 5 is a view similar to FIG. 1 illustrating the present system in a truck bed without a liner; and FIG. 6 is a view similar to FIG. 1 illustrating the present system in a van, station wagon, or hybrid thereof.

DETAILED DESCRIPTION OF THE PREFERRED EMBODIMENTS

Referring to FIG. 1, a pick-up truck 10 is illustrated having a cargo bed portion 12 comprised of two side walls 14 and 16, a forward wall 18, a tailgate 20, and a floor 22. Portions of the side walls 14 and 16 comprise wheel wells 24 and 26.

A bed liner 28 is set within and secured to the truck bed 12 by suitable fasteners. The liner 28 is shaped to correspond to the shape of the bed 12 and has corresponding side walls 30 and 32, forward wall 34 and a base 36 to cover the bed floor 22. Outwardly directed flanges 38, 40, and 42 extend from the upper edge of the side walls 30 and 32 and forward wall 34, respectively, to overlap the top portion of the walls 14, 16, and 18 of the bed 12 and also conform and align the liner 28 to the truck bed 12. The conformance and alignment function is also provided by the wheel well cover portions 44 and 46 of the bed liner side walls 30 and 32, respectively.

The liner 28 is constructed of a moldable polymeric material with suitable wear characteristics to withstand frictional movement of heavy objects thereon and also withstand piercing by sharp edges or corners of certain objects when moved or disposed on the liner. Recesses, in the form of grooves 48 in this embodiment, may be disposed throughout the liner to lower the amount of surface area and also provide for drainage of fluid from the liner. This is particularly noteworthy in the base 36 of the liner 28 where grooves 48 are shown with cargo supporting surfaces 50 disposed between the grooves 48. The grooves 48 need not be uniform in any manner, although this construction is generally preferred.

Recess members 52 and 54 are positioned on the liner sidewalls 30 and 32, respectively. The recess members 52 and 54 are generally integrally formed with the liner side walls 30 and 32 and are positioned before and after the wheel well cover portions 44 and 46. The recess members 52 and 54 are comprised of a plurality of longitudinal recess elements 55. Each recess element 55 includes a pair of surfaces 56 and a groove 58. The recess members 52 and 54 are positioned on opposing liner sidewalls 30 and 32 such that the plurality of surfaces 56 and grooves 58 of the recess elements of recess member 52 oppose the plurality of surfaces 57 and grooves 59 of recess elements of recess member 54. This positioning enables a stop block 60 to be positioned in opposing recess element grooves 58 and 59 between pairs of adjacent recess element surfaces 56 and 57. The recess element surfaces 56 and 57 may be planar or acruate as desired. The grooves 58 and 59 may also be planar or acruate. Thus, the ends 64 and 66 of the stop block 60 are shaped according to the squared or curved grooves 58 and 59.

Generally, the recess members 52 and 54 are positioned before and after the liner wheel well cover portions 44 and 46. However, the recess members 52 and 54 may be positioned either before or after the wheel well cover portions 44 and 46. Furthermore, the recess members 52 and 54 may be positioned opposing one another on the wheel well cover portions 44 and 46. This positioning of the recess members 52 and 54, enables the stop block 60 to be positioned in front of and behind the wheel wells 24 and 26. Also, a plurality of stop block 60 may be placed in desired positions in opposing grooves 58 and 59 of opposing recess elements 55 of the recess members 52 and 54 for portioning the truck bed 12.

As seen in FIG. 2, a pair of stop blocks 60 may be positioned in opposing recess members 52 and 54 for securing cargo between the two stop blocks 60. The stop block 60 has a handle 62 and ends 64 and 66, which project into the recess element grooves 58 and 59 of opposing recess members 52 and 54, as best seen in FIG. 4. The stop blocks 60 are positioned in the grooves 58 and 59 such that the stop block 60 is substantially parallel with the grooves 58 and 59 and surfaces 56 and 57 of both the opposing recess element 55 of recess members 52 and 54.

FIGS. 5 and 6 illustrate that the present invention can be utilized without a bed liner and also interiorly of a cargo carrying vehicle such as a station wagon, van, or hybrid vehicle. Referring to FIG. 5, the cargo bed portion 12 has no bed liner. The primary recess members 52 and 54 are secured by suitable fasteners directly to the side walls 14 and 16 of the cargo bed portion 12 in front of and behind the wheel wells 24 and 26. The stop block 60 is detachably nested in the opposing recess element grooves 58 and 59 as set forth above.

As shown in FIG. 6, the recess members 52 and 54 are used with the walls 70 and 72 of a station wagon or van 74 and may also have concurrent multiple uses. In such an enclosed storage area, the components of the system may be readily disassembled and removed to return the area to its normal uses, such as for seating, or to return the area to one with no storage functions at all, as desired. Again the recess members 52 and 54 are secured to the walls 70 and 72 by conventional fasteners and the stop block 60 is operably associated with the opposing recess element grooves 58 and 59 as set forth above.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A cargo restraint system adapted to be mounted in a bed of an automotive vehicle having a horizontally extending support surface and a pair of side walls extending vertically from said support surface, said system comprising: a pair of side surfaces, each surface of said pair fixedly attachable to one side wall of said bed, said side surfaces extending a height from said horizontal support surface along said respective side walls substantially less than the height of the side walls of said bed; a plurality of pairs of recessed elements with one of each pair disposed on each of the side surfaces in opposition to the other; said pairs of recessed elements defining a series of discrete fixed placement locations, said recesses form inwardly open channels opened upwardly at the top of the channels and downwardly to the horizontal support surface; and at least one cargo restraining member adapted to extend between and to be detachably nestingly engaged with opposing ones of said recessed elements to restrain a load such that said cargo restraining member will be positioned transverse to said side walls of said bed between said opposing recessed elements across said horizontal support surface.

2. A cargo restraint system adapted to be mounted in a bed of an automotive vehicle having a floor and pair of elongated sides comprising: a pair of side surfaces one each extending upwardly from a respective one of said elongated sides of said bed, said pair of side surfaces opposing one another across said bed; said pair of side surfaces extending a height from said floor along said elongated sides of said bed substantially less than the height of the elongated sides of said bed;

an elongated planar cargo restraint member; and means for retaining said cargo restraint member in position with respect to said bed, said means for retaining being fixedly attached to said opposing side surfaces and covering only a portion of the vertical dimension of each of said sides, said means for retaining comprising a series of fixedly disposed recesses defining a series of fixed placement locations, said recesses form inwardly open channels opened upwardly at the top of the channels and downwardly to the floor; wherein said cargo restraint member is adapted to be adjustably positioned in a series of substantially fixed positions along said elongated sides of said bed between corresponding placement locations defined by opposed recesses.

* * * * *